Feb. 14, 1939.  C. W. F. HAMILTON  2,147,530
APPARATUS FOR THE ELEVATION AND DISPOSAL OF SPOIL
Filed March 8, 1937  5 Sheets-Sheet 1

Inventor:
Charles William Feilden Hamilton,
By Potter, Pierce & Scheffler,
Attorneys.

Feb. 14, 1939. C. W. F. HAMILTON 2,147,530
APPARATUS FOR THE ELEVATION AND DISPOSAL OF SPOIL
Filed March 3, 1937 5 Sheets-Sheet 2

Inventor:
Charles William Fielden Hamilton,
By Potter, Pierce & Scheffler,
Attorneys

Patented Feb. 14, 1939

2,147,530

UNITED STATES PATENT OFFICE 2,147,530

APPARATUS FOR THE ELEVATION AND DISPOSAL OF SPOIL

Charles William Feilden Hamilton, Fairlie, New Zealand

Application March 8, 1937, Serial No. 129,708
In New Zealand March 14, 1936

8 Claims. (Cl. 37—9)

This invention relates to an improved self-loading transporter device for the elevation and disposal of soil and like materials (hereinafter referred to as "spoil"). This device, which will herein be termed a "scoop", is of the type comprising a container rotatable to empty its contents at will, and mounted upon wheels, at least one of which is adapted to convey spoil from a cutting device into the said container.

A scoop of the above character formed the subject of my prior United States patent specification No. 2,008,354, in which there was described a scoop by means of which spoil is lifted from the ground, or excavated therefrom to a suitable depth, and, when lifted, transported to any desired spot and dumped readily without undue effort on the part of the operator. The said scoop broadly comprised a drum-like container rotatable to empty its contents at will, from an opening formed in the drum, and mounted on wheels, at least one of which is provided with an annular trough to receive spoil fed thereto by an associated cutting mouth during the rotation of the wheel, spoil being progressed in the trough in a substanially continuous column and then deflected therefrom into the container by means of an appropriately positioned deflecting member The object of the present invention is to provide an improved scoop of similar construction and incorporating the same principles, but having various improvements, both in the mechanism and the layout, adapted to render it more efficient, and more readily controlled by a single operator.

According to the present invention, there is provided a scoop of the kind referred to, wherein the cutting mouth is carried on, and movably mounted in relation to, either the container or the drawbar frame, and is adapted to be adjusted relative to the ground by the operator without necessitating rotation of the container.

According to a further feature of the invention, there is provided a scoop of the type described, wherein for the purpose of regulating the depth of cut while the apparatus is in motion, means are provided to enable the operator to raise and lower the cutting mouth relative to the ground without altering the position of the rotatable container.

When it is desired merely to transport spoil, without rotating the container, the adjustable cutting mouth, according to the invention, is adapted to be raised clear of the ground.

According to the invention, the cutting mouth may either be mounted pivotally from its rearward end, and/or may be adapted to move at substantially the same angle throughout the whole or a part of its travel in relation to the container or drawbar frame, according to its position of mounting.

Again, the cutting mouth can be adapted to move for part of its range of travel in a parallel plane, and for another part of its travel in pivotal manner.

In a scoop as described in my prior United States Patent No. 2,008,354, it was not possible to alter the position of the cutting mouth in relation to the ground except by rotating the container, since in that construction the former was permanently secured to the latter.

The invention further includes a scoop of the kind referred to, having a cutting mouth carried on, and adapted to be adjustably mounted in relation to, the container or the drawbar frame, and to be moved by remote control by the operator into and out of contact with the ground for the purpose of regulating the extent of cut therein, without necessitating any rotation of the container.

The adjustment of the mouth may be performed manually or automatically, for example by means of a power take-off shaft driven by the tractor engine, or by an independent prime mover.

According to yet another feature of the invention, the container is adapted to be brought into at least two operative positions, comprising, first, a filling and transporting position, with the cutting mouth lowered or raised into or out of contact with the ground respectively, and, secondly, an emptying position with the container rotated to present its open side downwardly.

The container may also be rotated to a scraping position, wherein one edge of the open side of the container is adapted to be used instead of the cutting mouth for the purpose of scraping spoil directly into the container without progressing it upwardly in the loading wheel.

In a scoop according to my prior United States Patent No. 2,008,354, the container was adapted to be brought into any of three operative positions: first a filling position, secondly a transporting position, and thirdly an emptying position. In one construction of scoop according to the present invention however, the filling and transporting position are the same as regards the container, the mouth being adapted to be lowered or raised respectively.

The loading and transporting position may, however, be variable over a certain arc of travel, in cases where it is desired to raise the mouth beyond its highest limit of adjustment relative to the container.

The emptying position of the container may, moreover, be variable over a certain arc of its travel, for the purpose of determining the degree of spreading exerted by the edge of the container.

The invention further includes a scoop of the type described wherein means are provided for interconnecting the container with one or more of the wheels, or part rotatable therewith, comprising a friction element attached to the one, and adapted to engage a suitable surface operatively associated with the other, whereby rotation of the container is effected at the same, or at a different speed from that of the wheels.

In one constructional form of the invention there is provided a scoop comprising a rotatable container freely mounted between wheels; a movable cutting mouth carried on the drawbar frame or on the container, and adapted to be brought into and out of contact with the ground by remote control by the operator, said cutting mouth, when lowered, serving to collect the spoil while the scoop is in motion and discharge the same into an annular conveyor trough incorporated in one of the wheels; baffle means associated with the container and operating to deflect the spoil from the conveyor trough into the container; means for releasing surplus spoil from the conveyor trough when desired; remotely controlled operating means arranged to cause the container to be moved to, and/or held in, any of its aforesaid operative positions, and further remotely controlled means adapted to raise or lower the cutting mouth and/or vary its depth of cut while the scoop is in motion.

One embodiment of the invention will hereafter be described, by way of example only, with reference to the accompanying drawings, whereof:—

Throughout the specification and drawings, like parts will be illustrated and referred to by like reference numerals.

Referring to Figs. 1 to 9 of the drawings, there is described a two-wheel scoop adapted to be tractor-drawn.

A container 1 of partially cylindrical form is horizontally and rotatably mounted on an axle 2 between two ground wheels, namely a loading wheel 3 and an idle wheel 4.

The cross section of the container 1, which is open at the top, is such that, when in the loading and transporting position, its lower and upper surfaces 1a and 1b are substantially parallel to the ground and to each other, the remaining portions 1c being of cylindrical contour and substantially corresponding to the circumference of the wheels. In certain cases, it may be advantageous to extend the curved portions of the container slightly beyond the periphery of the wheels; alternatively, they need not extend as far as the periphery of the wheels, as here shown.

The above cross section has been found to be efficient, although the container need not necessarily have such a cross section; it could, for instance, be U-shaped, rectangular, or of other cross section if such were convenient.

The so-called lower surface 1a (assuming the machine to be in the filling and transporting position) has a clearance above ground. The ends of the container 1 lie close to, and substantially parallel with, the inner faces of the wheels, and are slightly dished in an outward direction. The portion of the container 1 adjacent the cutting mouth 5 is slightly recessed at 1d to allow for the movement of the latter, which will be described hereafter. The said recessed portion may be of any convenient shape. (By the term "recessed", it is not intended to convey that there is any hole in the container at this point, but merely that clearance is allowed for the operation of the mouth and the passage of spoil.)

The frame structure of the scoop in the present embodiment is constructed of metal angle sections welded or otherwise attached together, but may equally well be formed of box sections, girder sections, plain bars, tubes or any other profiled section. The frame comprises side members 6a and 6b running forward from the axle 2 to a cross member 6c which runs parallel with the axle, in front of the container. This cross member 6c, which is adapted to carry various apparatus for the operation of the scoop, as will be hereafter described, is a braced triangulated structure formed of one or more angle sections.

From the outer ends of the cross members 6c the side members 6a and 6b are both extended forwardly and inwardly and meet at a point between the track of the wheels slightly to one side of the centre line and on the side where the mouth 5 is mounted. At this point they are joined by a further member 7, which extends forward at right angles to the cross member 6c, and which is adapted to carry, or, in certain cases, to form a part of, the drawbar 8, which is of conventional construction.

The reason for mounting the drawbar in a slightly offset position from the centre line of the track of the wheels, is in order to counteract the extra resistance on the side of the loading wheel 3, due to the drag of the mouth 5 and also of the loading wheel 3, as it progresses the spoil within it.

The loading wheel 3 of the scoop is fixed to the axle 2 by a key or its equivalent, whilst the idle wheel 4 is preferably free to rotate thereon. In certain cases, however, it may be found preferable to lock the so-called idle wheel to the axle to assist in the rotation of the loading wheel, if the loading is found to be difficult due to bad conditions of operation.

For this purpose, the hub 4a of the idle wheel is furnished with a pair of spaced flanges 4b, drilled to receive a spring-actuated locking pin 4c adapted to enter a hole formed in the flange of the collar 41a, which latter is keyed to the axle. With the pin 4c in this position, the idle wheel 4 is locked to the axle. To disengage the wheel, the pin 4c is pulled inwardly, in opposition to the spring, and the headed portion 4d is turned so as to bear upon the inner of the two flanges 4b, thus holding the pin out of engagement.

An annular conveyor trough 9 is provided in the periphery of the loading wheel 3, the inner face of which trough is left open, spoil being prevented from falling directly on to the ground by virtue of the end face of the container 1, which lies adjacent to, and forms a partial closure to, the said trough 9, except at the point where the spoil is fed into the container 1, at which place egress from the trough 9 is obviously essential, and at the point where spoil is fed into the conveyor trough 9 from the mouth 5 where ingress to the trough 9 is obviously essential.

In order to deal with varying conditions of spoil, it is advisable to allow for adjustment of the area of the opening between the conveyor trough and the container. This may be performed by means of detachable plates or the like.

At the underside of the container 1 (assuming the scoop to be in the position shown in Fig. 1), there is mounted the cutting mouth 5, in a manner to be hereafter described. This cutting mouth 5 is adapted to progress spoil laterally into the conveyor trough 9. Approximately diagonally opposite to the mouth, and also mounted on the container, is a main baffle member 10, adapted to deflect the spoil as it is progressed in the trough 9, and to cause the same to pass into the container. In certain cases, where the orifice at the end of the container 1 is of a large size and the spoil is fairly loose, it may not, at first, reach the baffle member 10 at all, but may fall directly into the container 1, until the latter has been partly filled, after which it will heap up and come into contact with the baffle 10.

A secondary baffle plate 11 is attached to the container 1 at a point in front of the main baffle plate 10, and approximately adjacent the upper extremity of the recessed portion 1d of the container. This baffle 11 is adapted to deflect any loose spoil which is running round in the annular trough 9 when rotation of the container has been effected into its emptying position, and to cause such loose spoil to fall from the trough 9 on to the ground.

When the container 1 has been filled, and while it is being transported with the mouth 5 raised clear of the ground, there is generally a considerable amount of spoil in the annular trough 9 between the mouth 5 and the main baffle 10. If the operator has taken a full load, this surplus spoil is unable to pass into the container, and is compelled (unless otherwise released) to remain in the conveyor trough until such time as rotation of the container for dumping is performed. This surplus spoil exerts a considerable braking effort on the loading wheel 3, and, in order to relieve the pressure of spoil in the trough 9, it is desirable to provide a relief door 12, adjacent the rearward end of the cutting mouth 5 and mounted on the container 1, adapted to release surplus spoil from the conveyor trough 9 and allow it to emerge on to the ground.

This relief door 12 is connected to the cutting mouth 5 by a chain 13 or similar means which operate in such a way that only the elevation of the mouth 5 to its highest position can effect the opening of the relief door 12. If the cutting mouth 5 is only partly raised, the relief door 12 will not open, so that, in the event of a cut being taken which only partially fills the container 1, the mouth 5 can be raised just clear of the ground, and the scoop brought into position preparatory to the next cut, without either rotating the container 1 and emptying its contents, or operating the relief door 12 and thereby releasing the spoil carried in the conveyor trough 9.

In the present embodiment, the cutting mouth 5 is mounted diagonally beneath the container 1 with its forward end 5a approximately in the centre of the track of the wheels and substantially directly below the forward edge of the container, whilst its rearward end 5b is adjacent, and feeding into, the lower portion of the conveyor trough 9, at a point well below, and slightly behind, the axle 2. The cutting mouth 5 is mounted on a pivot 15, and is further supported from behind at its forward end by a swinging arm 16, pivoted both to the mouth 5 at 17 and also to the bottom of the container 1 at 18. The arrangement of the pivots 17 and 18 is such that the forward end 5a and the greater part of the leading edge of the cutting mouth 5 can be lowered into contact with the ground when desired, so that forward movement of the scoop will cause the mouth 5 to pass through the ground and exert a slicing action, thereby progressing the spoil laterally and rearwardly into the conveyor trough 9.

If desired, the cutting mouth could be attached to the drawbar frame (not shown in the drawings). Moreover, the cutting mouth could, in some cases, be adapted to move not pivotally but in a parallel direction throughout its travel (not shown).

Alternatively, the cutting mouth can be adapted to move for part of its range of travel in a parallel plane until such time as it is close to the ground, subsequently being adapted to move in a pivotal manner from its rearward end for performing the final adjustment of cutting depth (this constructional form is not shown in the drawings).

In the mounting of the cutting mouth 5 with respect to the container 1, an acute angle is formed between the former and the latter, which would tend to trap boulders and such like, but for the provision of a plate 19 having a leading edge normally located slightly above ground level and disposed parallel to the axis of rotation of the container 1. This plate 19 may form part of the rear pivotal mounting of the cutting mouth, or, as shown, may be fixed to the container 1 and remain stationary with respect thereto, regardless of any movement of the mouth 5. The purpose of this plate is to fill up the acute angle to such an extent as to prevent the ingress of boulders and like solid objects.

Various sizes and types of cutting mouth may be used on the same scoop, and may be interchangeable according to the conditions of spoil in which the scoop operates.

A forwardly and upwardly projecting arm 20 is attached to the cutting mouth 5, and engages at 21 with the end of a vertically adjustable depth-controlling member 22, adapted to regulate the height of the cutting mouth 5 relative to the ground, and also the depth of cut therein when the mouth is lowered.

Figure 7:
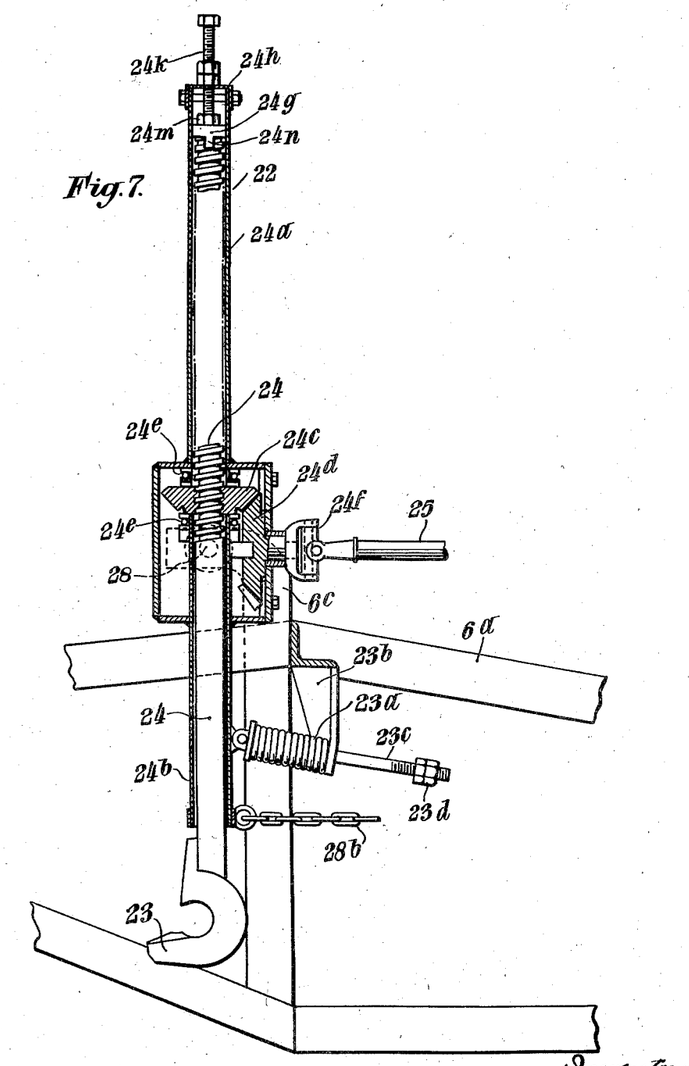
Fig. 7 is a detailed view of the member controlling the depth of the cut of the mouth.

The construction of the depth-controlling member is shown in detail in Fig. 7, and comprises a squared tubular housing 24a enclosing a threaded shaft 24, which projects downwardly, and on the lower end of which is carried the hook 23. At the lower end of the housing 24a, a gear casing is formed, secured to the cross member 6c by projecting pins 28, whereby the whole depth-controlling member is free to swing about its pivotal axis 28. In this manner the hook 23 at the lower end thereof can swing fore and aft and follow the arc described by the end 21 of the arm 20 attached to the cutting mouth 5, while the latter is being raised or lowered. In axial alignment with the housing 24a, and projecting through the bottom of the gear casing, is a tube 24b of circular cross section, which encloses the lower portion of the shaft 24. Within the gear casing, are located two co-acting bevel pinions 24c, 24d, the former, 24c, threaded on to the shaft 24, and mounted in ball thrust bearings 24e, whilst the latter 24d is journaled in the side of the gear casing, and operatively connected to an universal joint 24f.

In order to prevent the shaft 24 from turning with respect to its housing 24a, there is fitted to its upper extremity a square end plate 24g, freely slidable in the squared housing 24a. In order to limit the upward travel of the shaft 24, and hence to afford an accurate vertical adjustment for the hook 23, the upper end of the tubular housing 24a is furnished with an end cap 24h, through which is threaded an adjusting set screw 24k, adapted to abut on the head of a stud 24m, serving to secure the square plate 24g. The said plate 24g is furnished with a feather 24n engaging a slot in the end of the shaft 24 so as to prevent relative movement between the shaft 24 and the end plate 24g.

Rotation is given to the aforesaid bevel pinions 24c, 24d, by means of a forwardly projecting rod 25 connected thereto by any suitable form of universally jointed coupling such as 24f, and connected at its front end by constant mesh bevels carried by a pivoted coupling 26 to a hand wheel 27 arranged at any convenient position for operation from the tractor.

The profile of the hook 23, which forms a part of the depth-controlling member 22, is preferably so arranged that when the cutting mouth 5 is drawn rearwardly, due to the container 1 rotating with the wheels while the scoop is moving forward, the projecting arm 20, 21, is drawn away from the hook 23, and released therefrom. If it is desired to rotate the container 1 in a reverse direction, it is essential to withdraw the hook 23 from the projecting arm 20, 21, of the cutting mouth 5 prior to such rotation. Since the whole of the rising and falling depth-controlling member 22 is pivotally mounted at its upper end on a horizontal axis, and connected by a chain 28b to the operating lever 29 which controls a latch holding the container in position (as will be hereafter described), it follows that the hook 23 is drawn forwardly away from the end 21 of the arm 20 of the cutting mouth 5 when the operating lever 29 is pulled; the container may then be rotated.

A compression spring 23a is employed to maintain the depth-controlling member 22, 23, in engagement with the end 21 of the arm 20. This compression spring 23a abuts both against the casing 24b and also a lug 23b attached to some part of the cross member 6c of the frame. In order to maintain the compression spring in position, it is carried on a bolt 23c, which latter is pivotally attached at one end to the casing 24b, and passes at its other end through a hole in the lug 23b. At this point, the bolt 23c is threaded to carry one or more locking nuts 23d, adapted to limit the travel of the spring 23a, and hence of the bolt 23c and shaft 24, which carries the hook 23.

In order to hold the container 1 in any of its operative positions, at least two projecting stops 30 are provided, adapted to be positioned on diametrically opposite sides of the container 1 on the bowed portions 1c thereof, the said stops 30 being located in such a position that when any one of them engages with a latch mechanism, mounted on the cross member 6c of the frame (and later described), the container 1 is firmly held in its respective operative position. Where more than two projecting stops 30 are provided, they are located at points on the circumference of the container adapted to hold the latter in any desired position.

The latch mechanism 31 comprises a downwardly projecting arm 32 pivotally attached at 28a to the frame of the scoop forwardly of the container. This arm has a recessed portion at its lower end, of such a shape as to allow any of the stops 30 on the container 1 to slide into the recess and be held therein when the container has been rotated with the wheels to any operative position. A link member 33 is attached to the bottom of this arm, and carried forwardly, the said link being slotted at its other end and attached at a suitable distance along the controlling lever 29 which is mounted adjacent the drawbar 8 of the scoop. A tension spring 34, or similar device, tends to bring the latch mechanism 31 into engagement with the stops 30 by moving the latch member 32 rearwardly. The controlling lever 29 is adapted to be operated from the tractor, or other tractive device, by direct or remote control. The purpose of the slot 35 in the forward end of the link member 33 is to enable the latch member and link member 32 and 33 readily to be pushed forwardly while any stop 30 on the container is coming into position in the recess, without necessarily having to move, and hence overcome the inertia of, the lever and control mechanism. It is to be understood, of course, that any other form of unidirectional device may be used for the same purpose.

It is necessary to provide means for holding the mouth 5 in its raised position during rotation of the container 1, as otherwise it is liable to swing freely and foul the frame structure 6c of the scoop. For this purpose a catch 16a is provided secured to the underside of the container and spring-loaded to engage the link member 16, when the latter engages it.

Rotation of the container from the loading and transporting position into the emptying or dumping position is effected as follows (see Figs. 3 and 4):—

Figures 1, 6A:
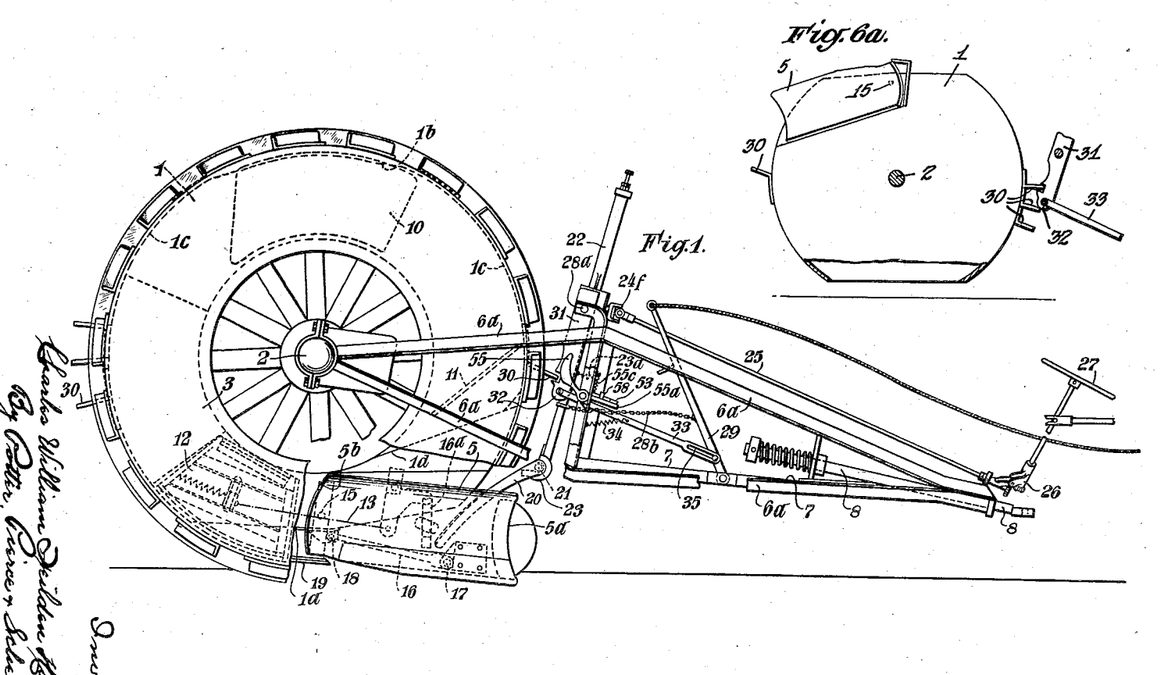
Fig. 1 is a side elevation of the scoop showing a portion of the loading wheel cut away to give a view of the cutting mouth.
Fig. 6a is a diagrammatic end elevation of the container in emptying position.
Figure 2:
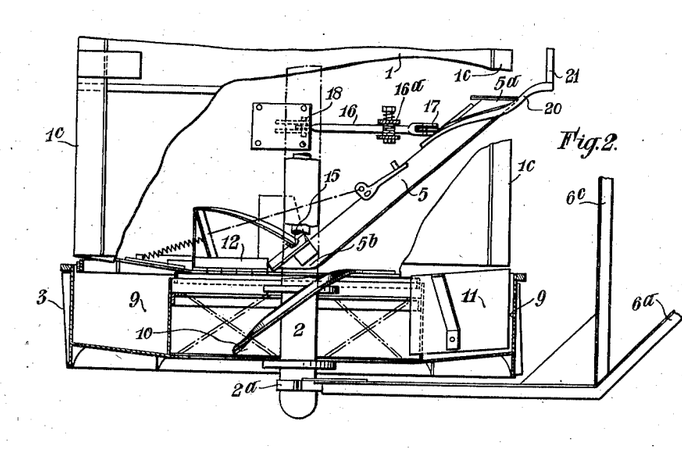
Fig. 2 is a half plan view of Fig. 1 from above with a portion of the container removed to illustrate the mounting of the muoth, and showing the loading wheel with the upper half of the tyre removed to illustrate its interior construction.
Figures 3, 8:
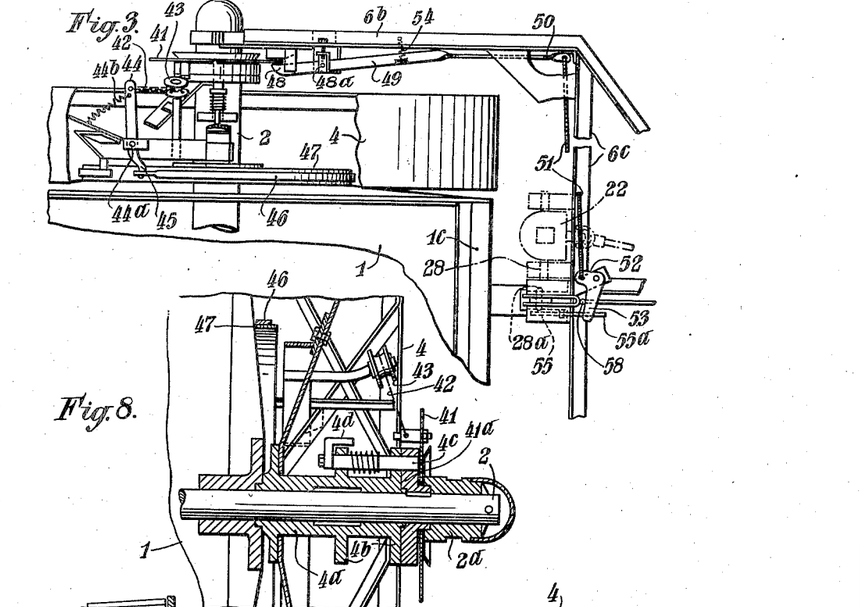
Fig. 3 is a part-sectional plan view of the idle wheel which has been cut away in portions to show the braking mechanism.
Fig. 8 is a detailed view of the construction of the hub of the idle wheel showing the mounting of some of the brake mechanism.
Figure 4:
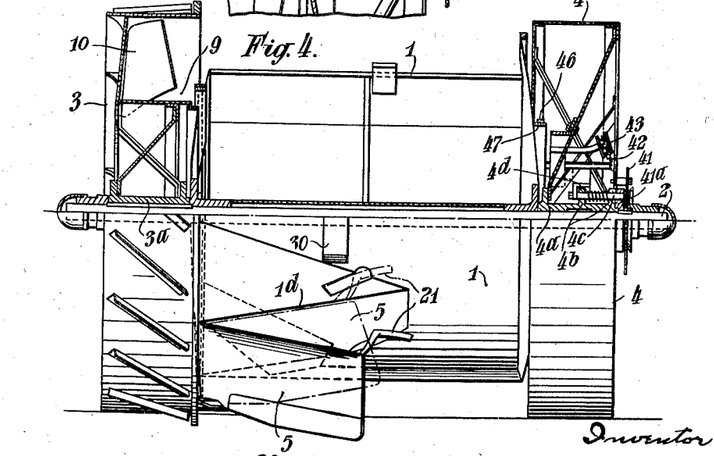
Fig. 4 is a front view of the scoop with the frame members removed showing the positions of the mouth, and with the upper half of the wheels sectioned to show their construction.
Figures 5, 5A:
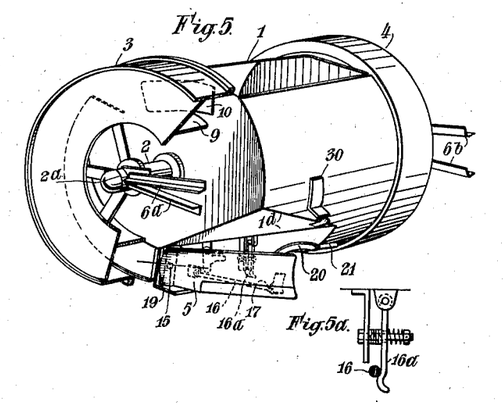
Fig. 5 is a perspective view of a scoop in diagrammatic form.
Fig. 5a illustrates a detail of the catch for the mouth.
Figure 6:
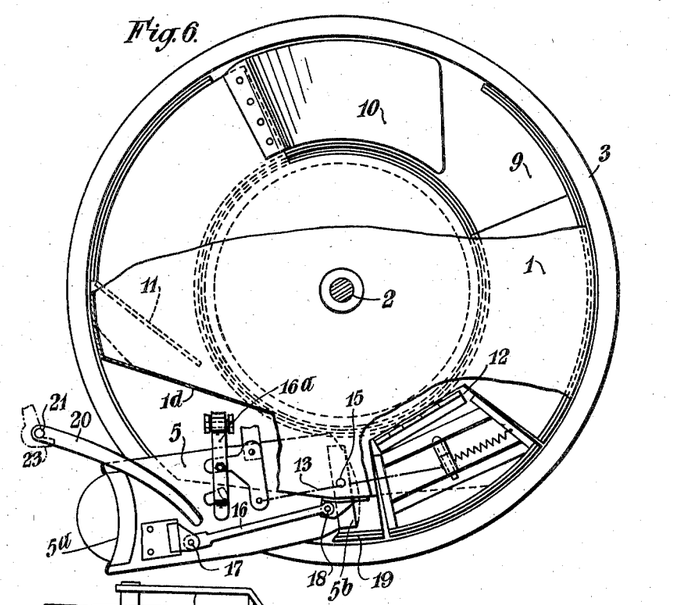
Fig. 6 is a detailed view of the cutting mouth showing its mounting.

A flat plate or braking disc 41 is freely mounted on a flanged collar 41a, keyed to the axle 2 on the outside of the idle wheel 4, but is held against unlimited axial movement on the said collar 41a by means of the drawer bearing 2a. A chain 42 is attached to the said disc 41 and passes over a pulley 43 fixed on the idle wheel 4, and thence is attached to a lever 44 pivoted at 44a on the wheel 4. The lever 44 at its opposite end 45 is attached to a band brake 46 which passes around, but normally does not make braking contact with, a brake drum 47 mounted on the end of the container 1. Normally the braking disc 41 is caused to rotate with the wheel 4 by the tension of the spring 44b which exerts a pull on the chain 42, but, if the disc 41 is caused to lag, the chain 42 exerts a pull on the lever 44, 45, which is itself mounted on the idle wheel 4 and rotates therewith. A friction element (later described) is mounted on the frame of the scoop, and adapted to be operated by remote control in such a manner that, when desired, it can be brought into contact with the flat plate or braking disc 41, and cause the latter to lag relative to the idle wheel 4. In this manner, the chain 42 is caused to exert a pull on the lever 44, 45, which in turn contracts the brake band 46 on the drum 47 of the container 1, and causes the latter to rotate in the same direction as the idle wheel 4.

Braking effort is exerted on the disc 41 by means of a friction element 48 mounted on the end of an arm 49 which runs substantially parallel to the side frame member 6b of the scoop, forward of the axle 2, and pivots about a vertical axis 48a. This arm 49, at its forward end 50, is formed of springly material, in order that, when the brake is applied to the disc, any seizing may be eliminated. The arm 49 extends forwardly as far as the cross member 6c on the frame of the scoop, and a connecting link 51 extends along this cross member 6c as far as the centre of the scoop, where it is attached to one arm 52 of a horizontal bell crank lever.

The other arm 53 of this bell crank lever projects into the path of an upwardly extending pin 58 carried by the link member 33, so that when the lever 29 is pulled for the purpose of releasing the latch mechanism 31 and the depth controlling mechanism 22 from the container stop 30 and the mouth arm 20, 21, respectively, the pin 58 engages the arm 53 and causes a pull to be exerted on the connecting link, 51, thereby actuating the brake mechanism and locking the container 1 to the idle wheel 4.

In order to hold the brake on during rotation of the container without necessitating that the operator should maintain a pull on the lever 29, a trip member is provided. This member takes the form of a cranked lever having an upwardly extending arm 55 with a bowed profile which projects slightly into the path of the container stop 30. The other arm 55a passes forward and normally lies underneath the arm 53 of the bell crank lever. A spring 55c is employed to move the cranked lever about its pivotal point 55b if the arm 53 is withdrawn, and to cause the arm 55a to be lifted into the path of the returning arm 53 of the bell crank lever when the latter is released by the operator, thus holding the brake on.

In order to release the said trip mechanism, it is necessary to disturb the position of the cranked lever, and this is performed by the stop 30 on the container striking the arm 55, which causes the other arm 55a to move downwardly out of the path of the arm 53 of the bell crank lever, which latter is then returned to its normal position up against the pin 58 by means of the spring 54, which tends to hold the brake in the off position.

Provision is made for the adjustment of the tension in the brake mechanism by means of a suitable adjustable union in the connecting link (not shown).

When the scoop is used in light worked up soil, it is sometimes found that some of the soil tends to be thrown in front of the loading wheel. In order to prevent this occurring, a light plate (not shown in the drawings) may be slung from the cross member on the frame forward of the container, running parallel to the wheel and extending downwardly from the cross member and rearwardly for a short distance alongside the inner face of the wheel. Thus any soil that is pushed sideways will be prevented from passing underneath the wheel by this plate, which, in turn, will be prevented from swinging sideways under the pressure of the soil by butting against the inner face of the loading wheel. This plate is so mounted that it is caused to lie up against the inner surface of the loading wheel, either by its own weight, or by means of guide members, or by a combination of both. This plate may be so attached that it will swing clear of the ground, or, alternatively, trail freely, when the scoop is reversed.

Figures 9, 10:
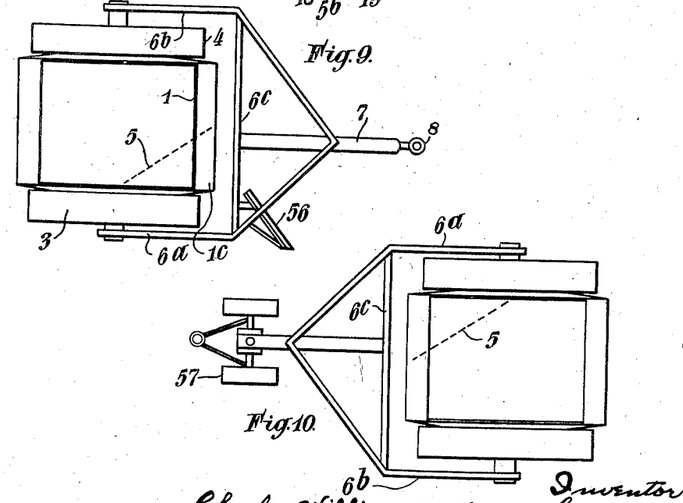
Fig. 9 is a diagrammatic view of a scoop with a grader attached.
Fig. 10 is a diagrammatic view of a scoop with a bogie attachment at the front.

If it is desired to cut into banks or the like, a cutting edge 56 may be mounted on the forward cross member 6c of the scoop, in the manner of a grader (see Fig. 9).

This cutting edge 56 would run diagonally and roughly at right angles to the cutting mouth, and would extend from a point outside the loading wheel, rearwardly towards the centre of the scoop.

The scoop need not necessarily have only two ground wheels. If desired, one or more extra ground wheels 57 may be provided in addition to the wheels 3 and 4 taking the main load of the container, the said additional wheels preferably being capable of being steered. For example, a scoop as diagrammatically illustrated in Fig. 10, is adapted to be drawn by a horse team in the absence of a tractor.

It is to be understood that the embodiment above described is by way of example only, and is not intended to limit the scope of the invention to the particular details included therein.

Any of the controls or adjustments may be performed mechanically, hydraulically, or electrically, or by a combination of any two or more of these methods.

I claim:

1. In a scoop for the purpose specified, a pair of wheels, a container rotatably mounted between said wheels, means for bringing said container into at least two operative positions, said positions being respectively an emptying position and a filling and transporting position, a cutting mouth carried by the container, an elevating trough within one of said wheels, and means operable when said container is in the filling and transporting position to raise and lower the cutting mouth with respect to the container, thereby to move the cutting mouth into and out of contact with the ground.

2. In a scoop for the purpose specified, the combination with a container and a pair of wheels by which said container is carried, of means for interconnecting said container with one of said wheels, comprising a friction element and a co-operating member mounted on said container and said wheel respectively, said element and member when brought into co-operation serving to effect rotation of the container with the wheel at the same or at a different speed.

3. A scoop comprising a pair of wheels, a container mounted for free rotation between said wheels, a movable cutting mouth operatably associated with said container, means for raising and lowering said cutting mouth, said cutting mouth when lowered serving to collect spoil when said scoop is travelling, an annular conveyor trough incorporated in one of said wheels, said trough receiving the spoil from the scoop and conveying it into said container, baffle means serving to deflect the spoil from said trough into said container, means for releasing surplus spoil from said trough, remotely controlled operating means associated with said container, said means being adapted to move and hold said container in loading, transporting, discharging and scraping positions, and remotely controlled means associated with said cutting mouth, said last mentioned means serving to adjust the position of the cutting mouth.

4. A scoop as claimed in claim 3, including a release door on said container.

5. The combination with a scoop comprising a pair of wheels and a container mounted for free rotation between said wheels, a cutting mouth mounted diagonally below one end of said container, and an elevator in one wheel for receiving soil from the cutting mouth and discharging the same into said container, of a plate having a leading edge normally located slightly above ground level and disposed parallel to the axis of rotation of said container, said plate serving to prevent solid objects from lodging in the angle formed between the container and the diagonally mounted mouth.

6. In a scoop for the purpose specified, the combination of a container, an axle, a pair of wheels, mounted on said axle, said container being also mounted on said axle, one of said wheels being fixed to said axle, means for locking the second wheel to said axle, means for locking said container to one of said wheels, said means including a brake drum on said container, a brake band passing around said drum, mechanism operatively associated with said brake band, means for locking said mechanism in the brake engaging position, and means carried by said container for releasing said mechanism.

7. In a scoop for the purpose specified, the combination with a container and a cutting mouth, of means for adjusting the cutting mouth relatively to the ground over which the scoop passes; said means for adjusting said cutting mouth comprising a gear casing pivotally mounted on said scoop, gearing in said casing, means for actuating said gearing, one of the gear elements forming a nut, and the other forming a screwed spindle, tubular casings extending from opposite ends of said gear casing, means in one of said tubular casings for preventing rotation of said screwed spindle, means on one of said tubular casings to limit movement of said screwed spindle, a hook at the free end of said screwed spindle, said hook being adapted to engage with said cutting mouth, resilient restoring means for engaging one of said tubular casings, and means for rocking said casing.

8. The combination with a scoop for the purpose specified and comprising a container and means supporting said container for rotation into different positions, of a pair of stops on said container, a latch mechanism for co-operating with said stops, said mechanism comprising a pivotally mounted downwardly projecting arm, said arm having a notch therein for co-operating with one of said stops at a time, a link member connected to said arm, a lever for operating said link, a lost motion device between said lever and said link, and resilient means operatively associated with said link, said resilient means normally tending to hold said arm in engaging position.

CHARLES WILLIAM FEILDEN HAMILTON.